United States Patent [19]
Yokosawa et al.

[11] Patent Number: 5,110,470
[45] Date of Patent: May 5, 1992

[54] CERAMIC FILTER AND PROCESS FOR MAKING IT

[75] Inventors: Kiyoshi Yokosawa; Naohito Wajima, both of Kanagawa, Japan

[73] Assignee: Toto Ltd., Japan

[21] Appl. No.: 603,019

[22] Filed: Oct. 25, 1990

[30] Foreign Application Priority Data

Oct. 26, 1989 [JP] Japan ................... 1-279105

[51] Int. Cl.⁵ .............................. B01D 33/21
[52] U.S. Cl. ...................... 210/500.23; 210/500.25; 210/500.26; 210/504; 210/506; 210/510.1; 264/45.5; 264/48; 264/60
[58] Field of Search ............. 210/500.1, 504, 506, 210/509, 510.1, 653, 640, 490, 500.26, 654, 500.25, 500.23; 264/45.5, 48, 60

[56] References Cited

U.S. PATENT DOCUMENTS

| | | | |
|---|---|---|---|
| 4,981,590 | 1/1991 | Vanitveem et al. | 210/500.25 |
| 4,983,423 | 1/1991 | Goldsmith | 210/506 |

FOREIGN PATENT DOCUMENTS

| | | | |
|---|---|---|---|
| 0344011 | 11/1989 | European Pat. Off. | 210/500.25 |
| 59-62324 | 4/1984 | Japan. | |
| 59-102403 | 6/1984 | Japan. | |
| 59-109203 | 6/1984 | Japan. | |
| 60-156510 | 8/1985 | Japan. | |
| 2-126924 | 5/1990 | Japan. | |
| 2168336 | 6/1986 | United Kingdom | 210/510.1 |

*Primary Examiner*—Robert A. Dawson
*Assistant Examiner*—Ana Fortuna
*Attorney, Agent, or Firm*—Howard L. Rose

[57] ABSTRACT

A ceramic filter having good permeability and a superior durability, and a process for manufacturing the same. This filter comprises a porous support made of a ceramic, a fine intermediate layer formed on one surface of said support and comprised of at least one kind of particles selected from particles of $SnO_2$, $TiO_2$, $ZrO_2$ or $CeO_2$ and having a particle diameter of not more than 500 Å, and a thin film formed on the surface of said fine intermediate layer and comprised of at least one particles selected from particles of $SnO_2$, $TiO_2$, $ZrO_2$ or $CeO_2$ and having a particle diameter of not more than 300 Å and smaller than the particle diameter of the particles that constitute said fine intermediate layer.

11 Claims, 5 Drawing Sheets

5,110,470

CERAMIC FILTER AND PROCESS FOR MAKING IT

RELATED APPLICATIONS

The present application is related to U.S. application Ser. No. 07/616,355 filed Nov. 21, 1990, by Nobuyuki Maebashi for "Ceramic Filter and Process of Making It."

BACKGROUND OF THE INVENTION

1. Field of the Invention

The present invention relates to a ceramic filter comprised of a porous support made of a ceramic and, formed on one surface thereof, a thin film having pores finer than the pores of the support. It also relates to a process for manufacturing the same.

2. Description of The Related Art

As a ceramic filter used in the ultrafiltration, reverse osmosis or gas separation of pharmaceuticals or food, a filter is known which is comprised of a porous support made of a ceramic and, formed on one surface thereof corresponding to the side from which a substrate solution is flowed in, a thin film having pores (e.g., 200 Å) finer than the pores of the support, as disclosed in, for example, Japanese Laid-open Patent Application No. 59-62324, No. 59-102403, No. 59-109203 or No. 60-156510.

The above thin film comprises particles with a diameter smaller than the particles constituting the support, and is formed by preparing an alumina sol, a Boehmite sol or a colloidal silica or porous silica in the form of a sol which are in the form of hydrates formed by alkoxide hydrolysis, aqueous solution precipitation or the like, and applying any of these sols to the surface of the support, which is then dried to make it into a gel, followed by baking.

In the above conventional ceramic filter, the gel particles, when baked in the course of the formation of the thin film, may grow to give a large diameter, or this may make the thin film amorphous, and hence the resulting thin film can not be said to have a sufficient physical and chemical strength. To cope with this, the present applicant has disclosed in Japanese Laid-open Patent Application No. 2-126924 a ceramic filter in which particles of $SnO_2$, $TiO_2$ or $ZrO_2$ are used as gel particles for the formation of the thin film and are baked at a low temperature.

Selection of gel particles and also baking them at a low temperature as in the above enables formation of a thin film having a small pore size and a superior durability. However, in the case when the thin film is used as an ultrafiltration membrane or the like, the permeability is also important from the viewpoint of operating efficiency. An improvement is sought in this respect.

More specifically, the permeability can be improved if the thin film is made to have a thickness of as small as 1 μm or less and the particles constituting the thin film are made to have a smaller diameter. An excessively small film thickness, however, may cause the surface of the support, the ground, to be partially uncovered, or may result in an excessively great difference in particle diameter between the particles constituting the thin film and the particles constituting the support, tending to bring about peeling or cracks.

SUMMARY OF THE INVENTION

An object of represented by is to provide an improved ceramic filter having a good permeability and a superior durability.

The ceramic filter of the present invention comprises a support made of a ceramic, an intermediate layer formed thereon, a fine intermediate layer formed on the surface of said intermediate layer and comprised of at least one kind of particle selected from particles of $SnO_2$, $TiO_2$, $ZrO_2$ or $CeO_2$ and having a particle diameter of not more than 500 Å, and a thin film formed on one surface of said fine intermediate layer and comprised of at least one particle selected from particles of $SnO_2$, $TiO_2$, $ZrO_2$ or $CeO_2$ and having a particle diameter of not more than 300 Å.

The fine intermediate layer can be made to have a particle diameter of not more than 500 Å when baked at a temperature ranging from 400° C. to 900° C. The thin film can be made to have a particle diameter of not more than 300 Å when baked at a temperature ranging from 300° C. to 800° C.

Sols used for the formation of the above fine intermediate layer and thin film are applied to the support after addition of a thickening agent to each sol. Hence, it becomes easy to control film thicknesses of the films to be formed and also it is possible to prevent cracks or peeling from occurring when a sol is formed into a gel or a coating is dried.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
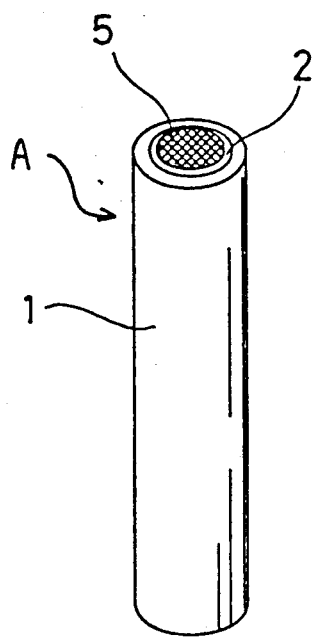
FIG. 1 illustrates the whole of a ceramic filter according to an embodiment of the present invention.
Figure 2:
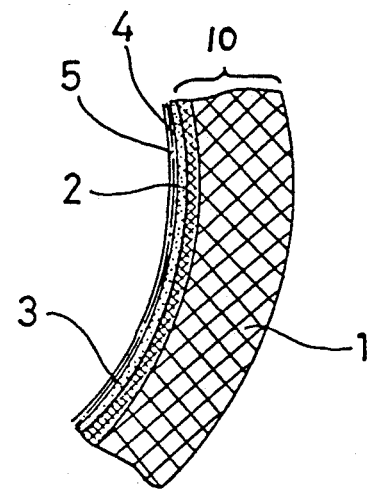
FIG. 2 is a partially enlarged cross-sectional view of the main part of the ceramic filter shown in FIG. 1.
Figure 3:
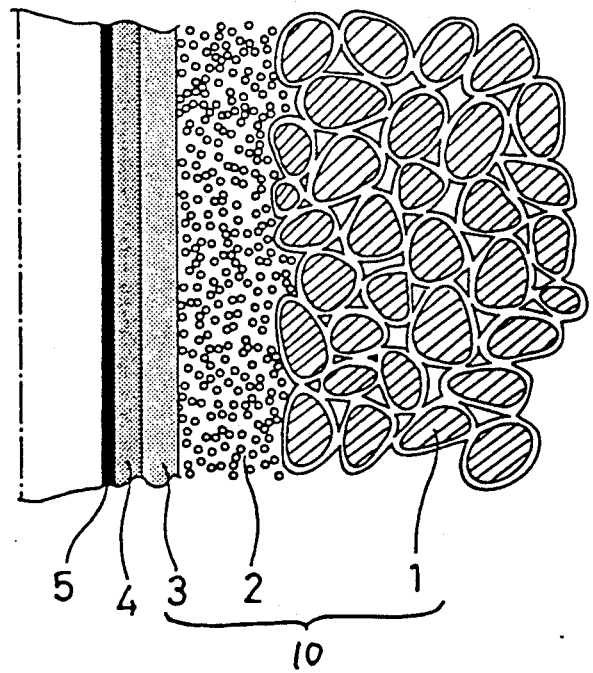
FIG. 3 is a partially enlarged cross-sectional view of FIG. 2.

In the embodiment as shown in FIG. 1, a ceramic filter A comprises a cylindrical support 10, 2 and 3 comprised of a base 1 made of a ceramic, a first intermediate layer 2 and a second intermediate layer 3, and a fine intermediate layer 4 and a thin film layer 5 which are formed on the inner surface of the cylindrical support 10.

The base 1 made of a ceramic has a length of from 200 mm to 1 m, an outer diameter of from 5 to 25 mm, an inner diameter of from 4 to 6 mm, a thickness of from 0.5 to 3 mm, and an average pore size of about 10 μm. The first intermediate layer 2 formed on the inner surface of the base 1 has a pore size of about 1 μm and a thickness of about 50 μm. The second intermediate layer 3 formed on the inner surface of the first intermediate layer 2 has a pore size of about 0.1 μm and a thickness of about 20 μm. The fine intermediate layer 4 formed on the inner surface of the second intermediate layer 3 has a thickness of 2 μm, and the thin film 5 formed on the inner surface of the fine intermediate layer 4 has a thickness of from 0.05 μm to 10 μm. The fine intermediate layer 4 is comprised of $SnO_2$, $TiO_2$, $ZrO_2$ or $CeO_2$ particles with a particle diameter of not more than 500 Å. The thin film layer 5 is comprised of $SnO_2$, $TiO_2$, $ZrO_2$ or $CeO_2$ particles with a particle diameter of not more than 300 Å.

Here, some may consider that $Al_2O_3$ or $SiO_2$ can be used as the particles constituting the fine intermediate layer 4 and the thin film layer 5. When, however, baked at a low temperature, these are brought into a non-crystalline state or a highly soluble crystalline state in which hydroxyl groups are contained in part, and hence disadvantageous in view of durability. Thus, it is advantageous to use $SnO_2$, $TiO_2$, $ZrO_2$ or $CeO_2$, having a high crystallinity and a low solubility.

The diameter of the particle that constitutes the thin film 5 may preferably be controlled to be ½ or more of the diameter of the particle that constitute the fine intermediate layer 4. Selecting the particle diameter in this way enables firm linkage at the boundary between the thin film 5 and the fine intermediate layer 4, bringing about an improvement in peel resistance. Hence, it becomes possible to set a high pressure at the time of back washing.

Since the fine intermediate layer 4 is provided between the thin film layer 5 and the support 10, the surface of the second intermediate layer 3 may not be uncovered even when the thin film 5 is made to have a thickness of 1.0 μm or less.

The ceramic filter as described above can be prepared according to the following steps.

First, to prepare the base 1 made of a ceramic, a ceramic powder as exemplified by alumina, silica, mullite, silicon carbide, silicon nitride or zirconia with a particle size distribution of from 10 to 30 μm is used as a starting material, and a composition comprising the powder is extruded to have a given form, followed by firing.

In the present embodiment, alumina ($Al_2O_3$) coarse particles are used as an aggregate material and alumina-zirconia ($Al_2O_3$-$ZrO_2$) mixed particles are used as a sintering aid. The alumina coarse particles are controlled to have an average particle diameter of from 20 to 30 μm, and the alumina-zirconia mixed fine particles an average particle diameter of from 0.1 to 0.3 μm. The alumina coarse particles and the alumina-zirconia mixed fine particles are blended in a proportion of, for example, 10:2 in weight ratio so that the alumina is in an amount of from 80 to 99 wt. % based on the total weight of the starting materials. Here, a mixture of materials such as aluminum hydroxide and zirconium oxychloride, capable of forming alumina and zirconia as a result of oxidation, may be used as the alumina-zirconia mixed fine particles.

The starting materials may be blended using a stirring mixing machine such as a mixer. It is advantageous to use a method in which alumina fine particles and zirconia fine particles are mixed and dispersed in a solvent such as water in a given proportion using a ball mill and the resulting dispersion is added to the alumina coarse particles described above, or a method in which alumina coarse particles and alumina-zirconia mixed fine particles are blended in a surface fusing apparatus so that the alumina mixed fine particles are fusion-bonded.

Thereafter, to the above mixed powder, methyl cellulose and water are added as forming aids, which are then kneaded. A formed product with a given shape such as a hollow cylinder or a flat plate is prepared using an extruder, and the resulting formed product is dried, and then fired at a given temperature (for example, 1,730° C.). Suitable molding methods as exemplified by rubber pressing can also be utilized.

Next, the first intermediate layer 2 and the second intermediate layer 3 are successively formed on the inner surface of the base 1. The first intermediate layer 2 and the second intermediate layer 3 may be comprised of the same materials as those used in the fine intermediate layer 4 and the thin film layer 5. They can be formed, for example, by applying the corresponding suitable sols, thereafter dehydrating these sols into gels, and further drying the gels, followed by baking. They are so formed that the first intermediate layer 2 formed on the base 1 has a smaller pore size than the base 1 and the second intermediate layer 3 formed on the first intermediate layer 3 has a pore size smaller than the first intermediate layer 3 and larger than the fine intermediate layer 4.

The form of the support may not be limited to the hollow cylinder as shown in the drawing. The support may also be in any form such as a flat plate, a disc, or a solid cylinder or a round rod or square rod in which a number of through-holes are provided in its longitudinal direction.

Figure 7:
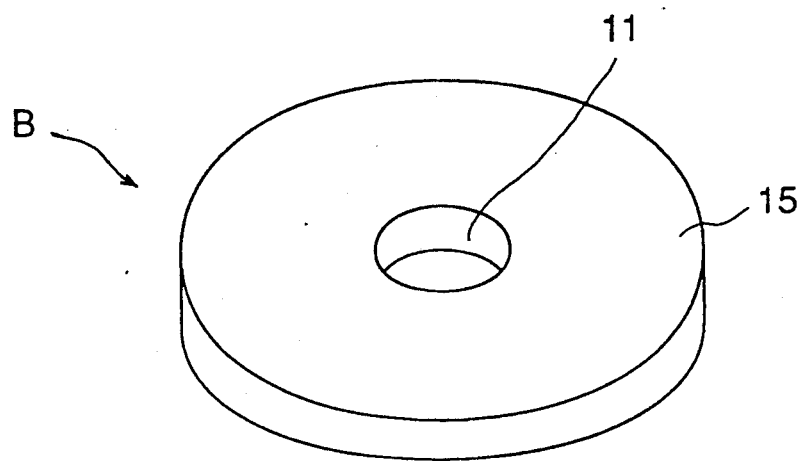
FIG. 7 illustrates the whole of a ceramic filter according to another embodiment of the present invention.
Figure 8:
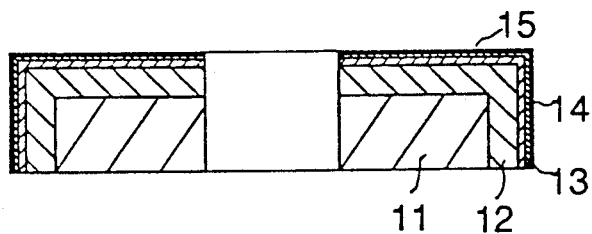
FIG. 8 is a cross-sectional view of the ceramic filter shown in FIG. 7.
Figure 9:
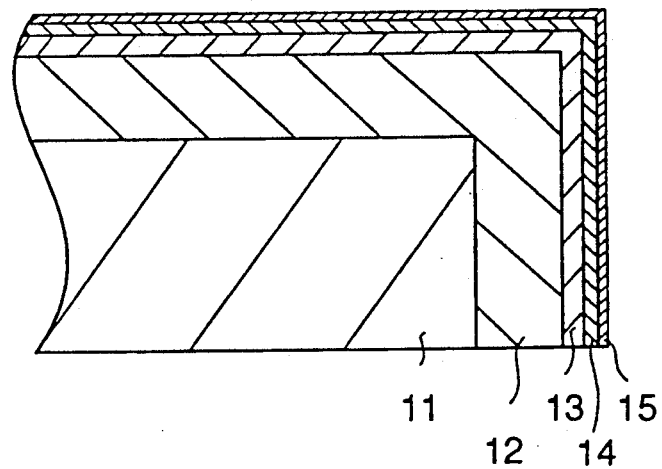
FIG. 9 is a partially enlarged cross-sectional view of FIG. 8.

FIGS. 7 to 9 illustrate a ceramic filter B comprised of a support having the form of a disc. The ceramic filter is provided with a through hole at its center and in its thickness direction. Like the embodiment described above, it comprises a base 11 made of a ceramic, a first intermediate layer 12, a second intermediate layer 13, a fine intermediate layer 14 and a thin film layer 15. The support of this ceramic filter has dimensions of from 10 to 200 mm in inner diameter, from 100 to 200 mm in outer diameter and from 5 to 20 mm in thickness.

Subsequently, at least one kind of particles selected from particles of $SnO_2$, $TiO_2$, $ZrO_2$ or $CeO_2$ are made into a slurry-like sol, which is then coated on the surface of the support 10 thus obtained, corresponding to the side from which a substrate solution is flowed in, i.e. on the inner surface of the second intermediate layer 13 in the present embodiment. Here, the sol may be prepared in a concentration of from 0.1 to 5 wt. % in terms of oxide. The particles constituting the sol may have a diameter of, for example, 35 Å or 80 Å in respect of $SnO_2$, 100 Å in respect of $TiO_2$, 140 Å in respect of $ZrO_2$ and 50 Å in respect of $CeO_2$, in approximation. In this instance, if the particles constituting the fine intermediate layer 14 has a smaller diameter, it becomes difficult for the water to permeate unless the fine intermediate layer 14 is made to have a smaller thickness. Now, in the present invention, a thickening agent is added to the above sol so that the sol can be applied to the inner surface of the support 11 in a thickness of about 2 μm. As the thickening agent, it is possible to use, for example, methyl cellulose or hydroxyethyl cellulose.

Figure 4:
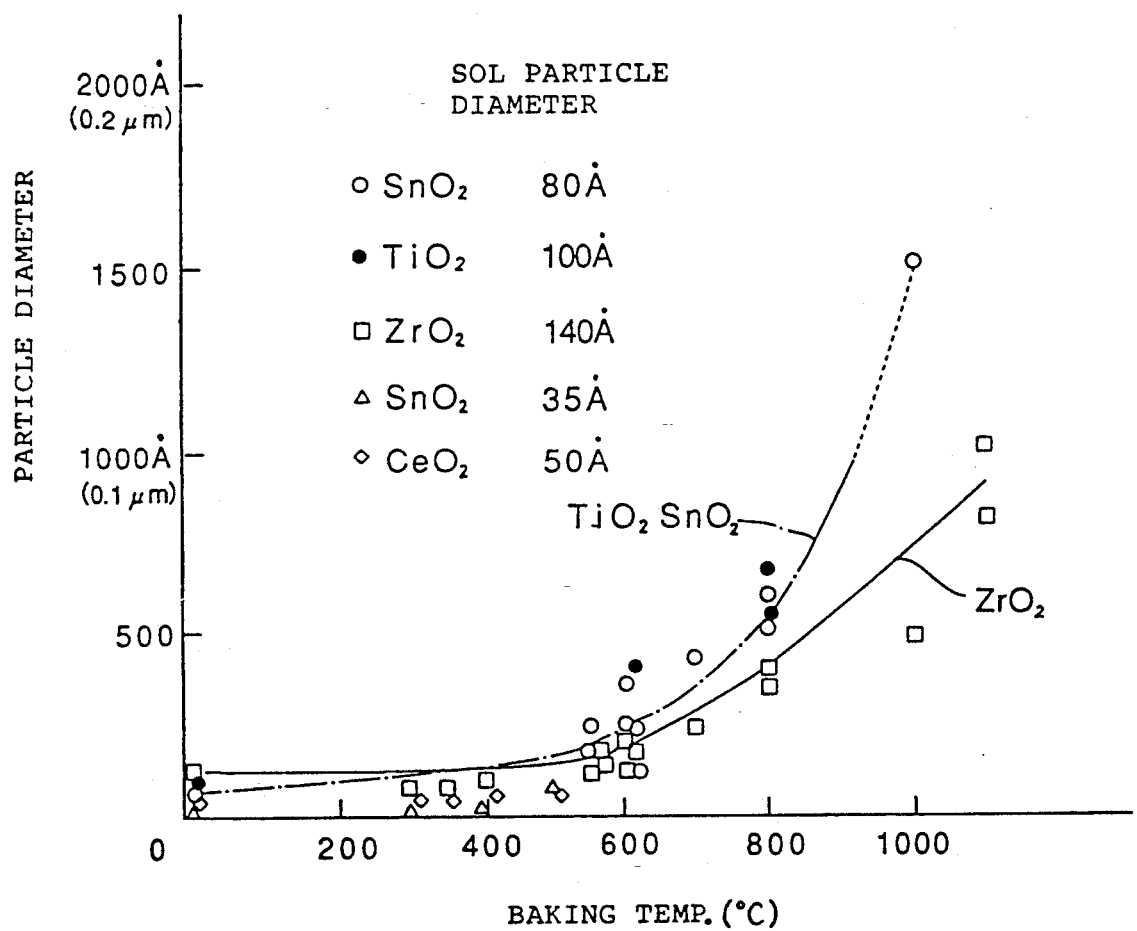
FIG. 4 is a graph to show the relationship between baking temperatures and diameters of baked particles.

After the sol comprising $SnO_2$, $TiO_2$, $ZrO_2$ or $CeO_2$ is applied to the inner surface of the second intermediate layer 3 of the support 10 in the manner as described above, the sol is dehydrated into a gel. Then, the resulting gel is dried and thereafter baked at a temperature ranging from 400° C. to 900° C. so that the baked gel particles may have a particle diameter of not more than 500 Å taking into consideration the relationship between the baking temperatures and the diameters of baked particles shown in the graph of FIG. 4. The fine intermediate layer 14 is thus formed.

Next, the above sol to which the thickening agent has been added is coated on the inner surface of the fine intermediate layer 14, and then dehydrated into a gel. Thereafter, the gel is dried and then baked at a temperature ranging from 300° C. to 800° C. and at a temperature lower than the baking temperature for the above fine intermediate layer 14 so that the baked gel particles may not grow to have a particle diameter of more than 300 Å. The thin film layer 15 is thus formed.

Permeation resistance (R) of the thin layer portion (including an intermediate layer, if any) is expressed as follows based on the Hagen-Poiseuille's equation.

$$R = l/(d)^2 \times c \tag*{}$$

wherein l is a film thickness, d is a pore size, and c is a constant.

Application of the above equation to a conventional thin film (film thickness: 1 μm; pore size: 100 Å) follows:

$$R_1 = 1/(100)^2 = 1/10,000 \tag{1}$$

Here, the pore size is proportional to the particle diameter. For example, when the particle diameter is 500 Å, the pore size comes to be about 200 Å.

On the other hand, application of the above equation to a thin film according to the present invention (thickness of thin film: 0.5 μm; pore size of thin film: 100 Å; thickness of intermediate layer: 1 μm; pore size of intermediate layer: 200 Å) follows:

$$R_2 = 0.5/(100)^2 + 1/(200)^2 = 3/40,000 \tag{2}$$

Comparison of the equation (1) and the equation (2) reveals that the present invention brings about an improvement in permeability by 25% on the theoretical basis.

Figure 5:
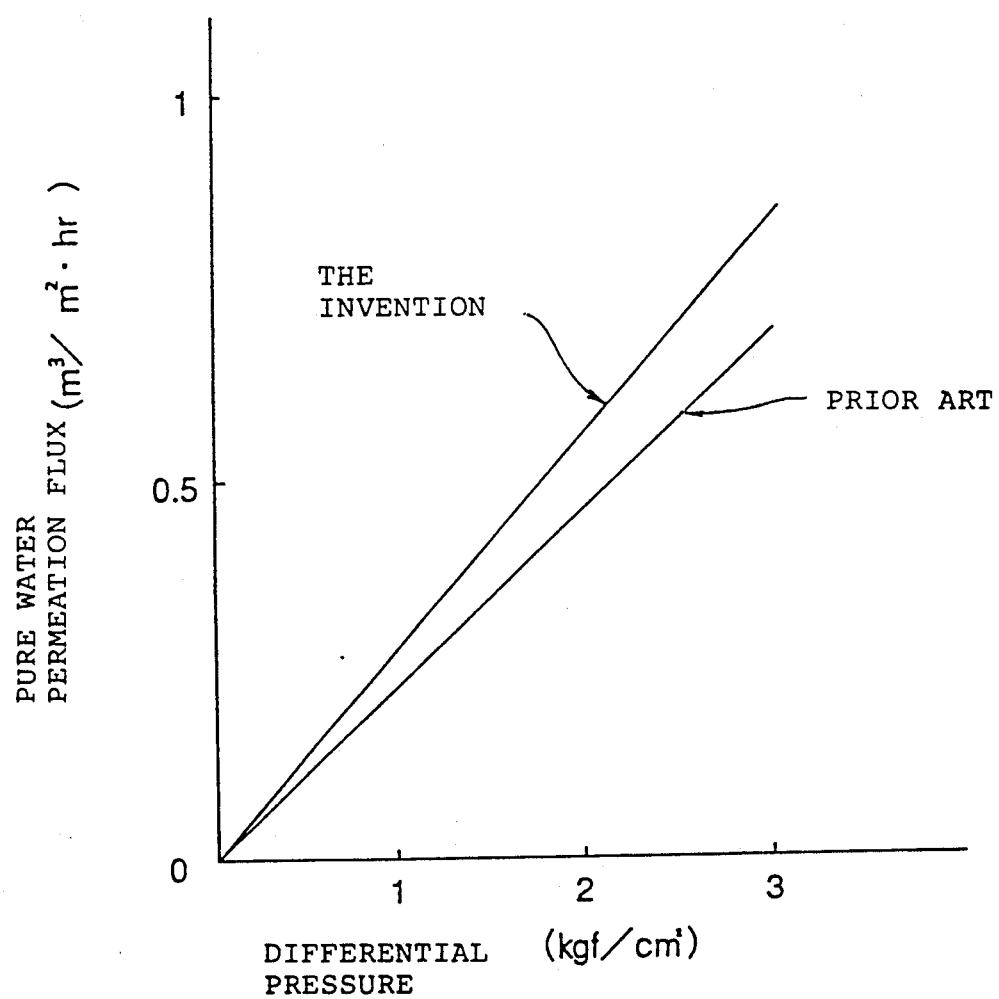
FIG. 5 is a graph to show the relationship between permeation flux and differential pressure.

FIG. 5 is a graph to show test results on the permeability. As is evident also from this graph, the present invention is seen to bring about a great improvement in the permeability.

Figure 6:
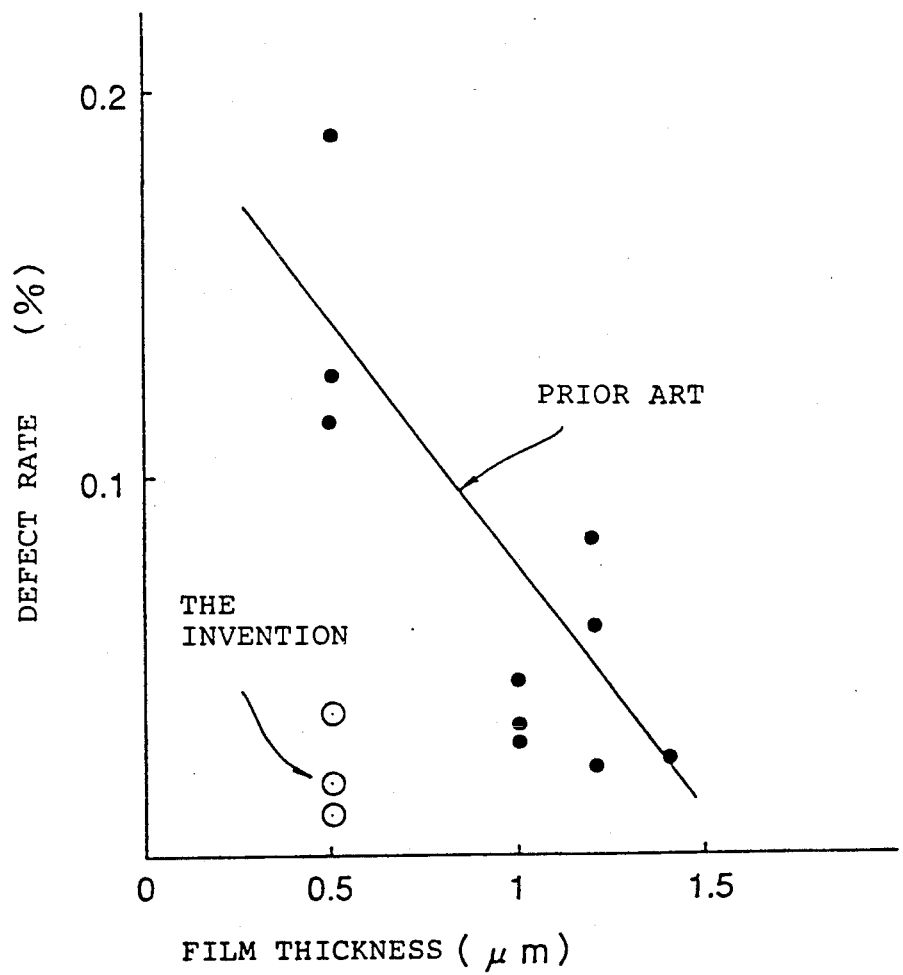
FIG. 6 is a graph to show the relationship between defect rate and film thickness.

FIG. 6 is a graph to show the relationship between defect rates and film thicknesses of thin films. As is evident from this graph, conventional thin films result in an increase in defect rates with a decrease in film thickness, but the present invention can decrease the defect rate.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

We claim:

1. A ceramic filter comprising:
    a porous support obtained by sintering starting material consisting of i) alumina coarse particles used as aggregates and ii) alumina-zirconia mixed fine particles used as a sintering aid and containing not less than 90 wt. % of alumina, which are so blended that the alumina is in an amount of from 80 to 90 wt. % based on the total weight of the starting materials, said material being shaped before sintering;
    a fine intermediate layer formed on one surface of said support and comprised of at least one kind of particles selected from particles of $SnO_2$, $TiO_2$ or $CeO_2$ and having a particle diameter of not more than 500 Å; said fine intermediate layer being obtained by baking a gel at a temperature ranging from 400° C. to 900° C.; and
    a thin film formed on the surface of sid fine intermediate layer and comprised of at least one particle selected from particles of $SnO_2$, $TiO_2$, $ZrO_2$ or $CeO_2$ and having a particle diameter of not more than 300 Å and smaller than the particle diameter of the particles that constitute said fine intermediate layer, said thin film being obtained by baking a gel at a temperature ranging from 300° C. to 800° C.

2. A ceramic filter according to claim 1, wherein said porous support comprises a base made of a ceramic, a first intermediate layer formed on said base and having a smaller pore size than said base, and a second intermediate layer formed on said first intermediate layer and having a pore size smaller than said first intermediate layer and larger than said fine intermediate layer.

3. A ceramic filter according to claim 1, wherein the particles that constitute said thin film have a particle diameter of not less than ½ of the particle diameter of the particles that constitute said fine intermediate layer.

4. A ceramic filter according to claim 1, wherein said thin film has a thickness of from 0.05 μm to 10 μm.

5. A ceramic filter according to claim 1, wherein said porous support is in the form of a hollow cylinder.

6. A ceramic filter according to claim 1, wherein said porous support is in the form of a disc provided with a through hole at its center and in its thickness direction.

7. A ceramic filter according to claim 1, wherein said porous support is comprised of i) a material comprising alumina coarse particles used as aggregates and ii) alumina zirconia mixed fine particles used as a sintering aid, containing not less than 90 wt. % of alumina, which are so blended that the alumina is in an amount of from 80 to 99 wt. % based on the total weight of the starting materials; said material being shaped, followed by sintering.

8. A ceramic filter according to claim 1, wherein said fine intermediate layer has thickness of 2 μm or less.

9. A ceramic filter according to claim 2, wherein said base has an average pore size of about 10 μm, said first intermediate layer has a pore size of about 1 μm and thickness of about 50 μm and said second intermediate layer has a pore size of about 0.1 μm and thickness of about 20 μm.

10. A ceramic filter comprising:
    a base obtained by sintering starting materials consisting of i) alumina coarse particles used as aggregates and ii) alumina-zirconia mixed fine particles used as a sintering aid and containing not less than 90 wt. % of alumina, which are so blended that the alumina is in an amount of from 80 to 99 wt. % based on the total weight of the starting materials, said material being shaped before sintering, said base having an average pore size of about 10 μm;

a first intermediate layer formed on said base and having a pore size of about 1 μm and thickness of about 50 μm;

a second intermediate layer formed on said first intermediate layer and having a pore size of about 0.1 μm and thickness of about 20 μm;

a fine intermediate layer formed on one surface of said second intermediate layer and comprised of at least one kind of particles selected from particles of $SnO_2$, $TiO_2$, $AnO_2$ or $CeO_2$ having a particle diameter of not more than 500 Å, said fine intermediate layer being obtained by baking a gel at a temperature ranging from 400° C. to 900° C. and having a smaller pore size than said second intermediate layer and thickness of about 2 μm; and a thin film formed on the surface of said fine intermediate layer and comprised of at least one particle selected from particles of $SnO_2$, $TiO_2$, $ZnO_2$ or $CeO_2$ and having a particle diameter of not more than 300 Å and smaller than the particle diameter of the particles that constitute said fine intermediate layer, said thin film being obtained by baking a gel at a temperature ranging from 300° C. to 800° C. and having thickness of from 0.05 μm to 10 μm.

11. A process for manufacturing a ceramic filter, comprising the steps of:

preparing a sol comprised of at least one kind of particle selected from particles of $SnO_2$, $TiO_2$, $ZrO_2$ or $CeO_2$;

adding a thickening agent to said sol;

coating the sol to which said thickening agent has been added, on one surface of a porous support made of a ceramic;

dehydrating the coated sol into a gel;

baking said gel at a temperature of from 400° C. to 900° C. to form a fine intermediate layer on the surface of said support;

coating said sol to which said thickening agent has been added, on the surface of said fine intermediate layer;

dehydrating the sol coated on the fine intermediate layer, into a gel; and baking the gel on the fine intermediate layer at a temperature of from 300° C. to 800° C. and at a temperature lower than the baking temperature for said fine intermediate layer to form a thin film on the surface of said fine intermediate layer.

* * * * *